United States Patent
Kojima et al.

(10) Patent No.: US 7,253,332 B2
(45) Date of Patent: Aug. 7, 2007

(54) METHOD FOR TREATING CYANIDE WASTE LIQUID

(75) Inventors: Ryuji Kojima, Tokyo (JP); Humihide Nakamura, Tokyo (JP); Yoshiyasu Yoneyama, Tokyo (JP); Kuniji Yashiro, Kanagawa (JP); Toshiko Totsuka, Kanagawa (JP)

(73) Assignees: Nihon Parkerizing Co., Ltd., Tokyo (JP); Parker Netsushorikogyo K.K., Tokyo (JP)

( * ) Notice: Subject to any disclaimer, the term of this patent is extended or adjusted under 35 U.S.C. 154(b) by 0 days.

(21) Appl. No.: 10/494,707

(22) PCT Filed: Nov. 7, 2002

(86) PCT No.: PCT/JP02/11589

§ 371 (c)(1),
(2), (4) Date: Jul. 6, 2004

(87) PCT Pub. No.: WO03/040045

PCT Pub. Date: May 15, 2003

(65) Prior Publication Data

US 2005/0070752 A1    Mar. 31, 2005

(30) Foreign Application Priority Data

Nov. 8, 2001    (JP)    ............... 2001-343081

(51) Int. Cl.
*A62D 3/00*    (2006.01)
(52) U.S. Cl. ..................................... 588/320
(58) Field of Classification Search ............... 588/320, 588/408, 413, 406; 210/756, 904
See application file for complete search history.

(56) References Cited

U.S. PATENT DOCUMENTS 4,416,786 A * 11/1983 Knorre et al. ............... 210/746
5,120,451 A * 6/1992 Costello et al. ............. 210/750
5,288,373 A * 2/1994 Yang ............................ 205/753

FOREIGN PATENT DOCUMENTS

| DE | 22 33 532 A1 | | 1/1973 |
|---|---|---|---|
| DE | 39 36 082 | * | 2/1991 |
| GB | 759 109 A | | 10/1956 |
| JP | 48-016457 A | | 2/1973 |
| JP | 50-118962 A | | 9/1975 |
| JP | 51-67672 | | 6/1976 |
| JP | 55-18501 | * | 2/1980 |
| JP | 55-49191 | * | 4/1980 |
| JP | 55-50718 B2 | | 12/1980 |
| JP | 5-337476 A | | 12/1993 |
| JP | 2001-269674 A | | 10/2001 |

OTHER PUBLICATIONS

DERWENT abstract accession No. 1973-07055U, for DE 2233532, published Jan. 1973.*
DERWENT abstract accession No. 1976-56960X, for JP 51-67672, published Jun. 1976.*
Treating Method of Cyano Waste-Liquor by Thermal Hydrolysis Method PPM-1977/8 pp. 58-67 (1977) and partial English translation thereof.
Techniques as well as Laws and Regulation for Preventing Environmental Pollution (1995) and partial English translation thereof.
Patent Abstracts of Japan, vol. 2002, No. 02, Apr. 2, 2002.

* cited by examiner

*Primary Examiner*—Edward M. Johnson
(74) *Attorney, Agent, or Firm*—Birch, Stewart, Kolasch & Birch, LLP

(57) ABSTRACT

A highly reliable detoxifying method of the cyano matters is provided. The waste-liquor, which contains at least one of free cyano material, a cyano complex and a reducing compound exhibiting volatility in alkaline aqueous solution, is heated under an alkaline condition to a temperature range, which lies within a range of from room temperature to the boiling point, and which includes a high temperature range of 80° C. or more, followed by holding the temperature; oxidation-reduction potential of the waste liquor is measured from the room temperature; and, hypochlorite is intermittently or continuously added to the waste liquor from the room temperature, until the oxidation-reduction of the hypochlorite is detected.

8 Claims, 6 Drawing Sheets

METHOD FOR TREATING CYANIDE WASTE LIQUID

TECHNICAL FIELD

The present invention relates to a detoxification treatment method of process-water, waste-water, waste liquor and the like, containing a cyano complex and the like.

BACKGROUND TECHNIQUE

The alkali chlorine method, which is broadly carried out in the detoxification treatment of waste-water containing cyanides, has two steps for decomposing cyanides, i.e., an addition of chlorine under an alkaline condition; and, subsequently, a conversion of pH to neutral and a further addition of chlorine. A sodium-hypochlorite aqueous solution is usually used as the chlorine, and the dosage control by means of an ORP meter is carried out as follows.

First Step Reaction: pH 10~12. The oxidation-reduction potential of 300~350 mV

$$NaCN+NaOCl \rightarrow NaCNO+NaCN \quad (1)$$

Second Step Reaction: pH 7~8. The oxidation-reduction potential of 600~650 mV

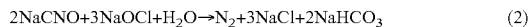
$$2NaCNO+3NaOCl+H_2O \rightarrow N_2+3NaCl+2NaHCO_3 \quad (2)$$

According to "Techniques and Regulations of Pollution Prevention, Water Chapter, $5^{th}$ Edition" supervised by the Environment and Location Bureau of the Ministry of Trade and Industry, pages 261~262), the free cyano matter and cyano complexes of zinc and copper can be oxidized and decomposed by the alkaline chlorine method under dosage control using an ORP meter. Contrary to this, the cyano complexes of nickel and silver can be decomposed solely by prolonged reactions with excessive chlorine. Consequently, the chlorine must be dosed in a constant amount exceeding that required for decomposition. The dosing control by an ORP meter is, thus, impossible. Furthermore, since complexes of iron, cobalt and gold, which form stable complexes, are also stable under the presence of excessive chlorine, their decomposition is allegedly difficult by the alkaline chorine method.

The cyano matters are designated as harmful material in the Prevention Law of Water Pollution, and are defined as the total cyano matters including the cyano complex. Treatment methods of the cyano waste-liquor including these stable cyano complexes have been developed.

According to the method of Japanese Unexamined Patent Publication No. 49-1058, the cyano waste-liquor, which contains a cyano complex, is heated in a pressure vessel to 150° C. or higher so as to hydrolyze the cyano complex, and the dissociated free cyano matters are thermally decomposed into ammonia and formic acid. This method is referred to as the thermal hydrolyzing method. The formic acid, which is a decomposition product of this method, is a COD component of the waste liquor, and the ammonia is subjected to the nitrogen regulation. A secondary treatment is, therefore, necessary.

A method developed for obviating the need for the secondary treatment, is the wet oxidizing method (Japanese Unexamined Patent Publication No. 7-116672). In this method, an oxidizing process is additionally carried out during the reaction in the pressure vessel as described hereinabove. According to this method, the cyanides are oxidized and decomposed into carbon dioxide and nitrogen.

The two types of methods described hereinabove are based on physical chemical reactions and are therefore highly reliable in detoxifying cyanides. However, since each of these two types is a high-pressure treatment, the investment cost is enormous.

When the waste-water containing cyano complexes is treated by the thermal hydrolysis method or the wet oxidizing method, the metal, which is converted to a complex by the cyano matters, is precipitated and deposited in the form of hydroxide and oxide, resulting in the formation of sludge. In order to detoxify the waste-water, which is incorporated in the sludge, mechanical stirring becomes necessary. Installation of a stirring means in a high-pressure vessel incurs considerable increase of investment cost because the sealing characteristics of the vessel must be ensured. This is the reason that hinders the employment of those methods.

The present inventors carried out a document search in a broad range to find such treatment methods of waste-water containing cyano complexes that require minimum investment costs and are highly reliable. As a result, the present inventors focused on Japanese Examined Patent Publication No. 50-118962. This publication describes that waste-liquor containing an iron cyano-complex is heated and detoxified by means of dosing the oxidizing agent in a constant amount.

According to the method of Japanese Unexamined Patent Publication No. 50-118962, the pH value of waste-liquor containing an iron cyano-complex is adjusted to approximately 10~11, an oxidizing agent (hypochlorite) is added, and the reaction is carried out while maintaining the liquor temperature at approximately 80~95° C. Allegedly, the iron cyano complex is converted to iron oxide under the pH and temperature condition mentioned above and precipitates. Further, the cyano matters are decomposed into carbon dioxide and nitrogen.

However, notwithstanding a lapse of 25 years from the invention of Japanese Unexamined Patent Publication No. 50-118962, use of this method virtually has not spread. It can be said that persons skilled in this field do not recognize at all this method to be capable of treating cyano waste-liquor, which contains stable cyano complexes such as nickel, silver, iron, cobalt and gold complexes.

The present inventors made a tracing test and thus confirmed that the waste-liquor containing an iron cyano complex was detoxified as described in the specification.

The present inventors presume that the above method has not been put into practice for the following reasons.

① Japanese Unexamined Patent Publication No. 50-118962 is the so-called chlorine treating method, in which the oxidizing decomposing always proceeds under an excessive amount of an oxidizing agent. The end point of the reaction is, therefore, not distinct. This method is, therefore, not reliable in the detoxifying the cyanides.

② The hypochlorite present in excess self-decomposes at a temperature of 80° C. or more. The amount of the reagent used becomes therefore excessive.

DISCLOSURE OF INVENTION

The present inventors directed their attention to the techniques of the heating-type alkali chlorine method (Japanese Unexamined Patent Publication No. 50-118962), which pertains to the detoxification of cyano waste liquor, such as the rinsing waste-liquor of the salt-bath nitriding treatment and plating waste liquor, and which involves low investment cost. Particularly, in a method for oxidizing and decomposing the waste-liquor, which contains such stable cyano complexes as nickel, silver, iron, cobalt and gold complexes, is maintained in a temperature range of 80° C. or more, and is oxidized and decomposed by the chlorine, the present inventors have established a method, which does not rely on the constant dosage resulting in excessive chlorine but which enables dosage control by the ORP meter.

As a result, the present inventors discovered a treating method of the cyano waste liquor, characterized in that the waste liquor, which contains at least one of free cyano matter, a cyano complex and a reducing compound exhibiting volatility in alkaline aqueous solution, is heated under alkaline conditions to a temperature range, which lies within a range of from normal temperature to boiling point, and which includes a high temperature range of 80° C. or more, followed by holding the temperature; oxidation-reduction potential of the waste liquor is measured from the room temperature; and, hypochlorite is intermittently or continuously added to the waste liquor from the room temperature, until the oxidation-reduction of the hypochlorite is detected. The problems mentioned above could thus be solved.

Figure 1:
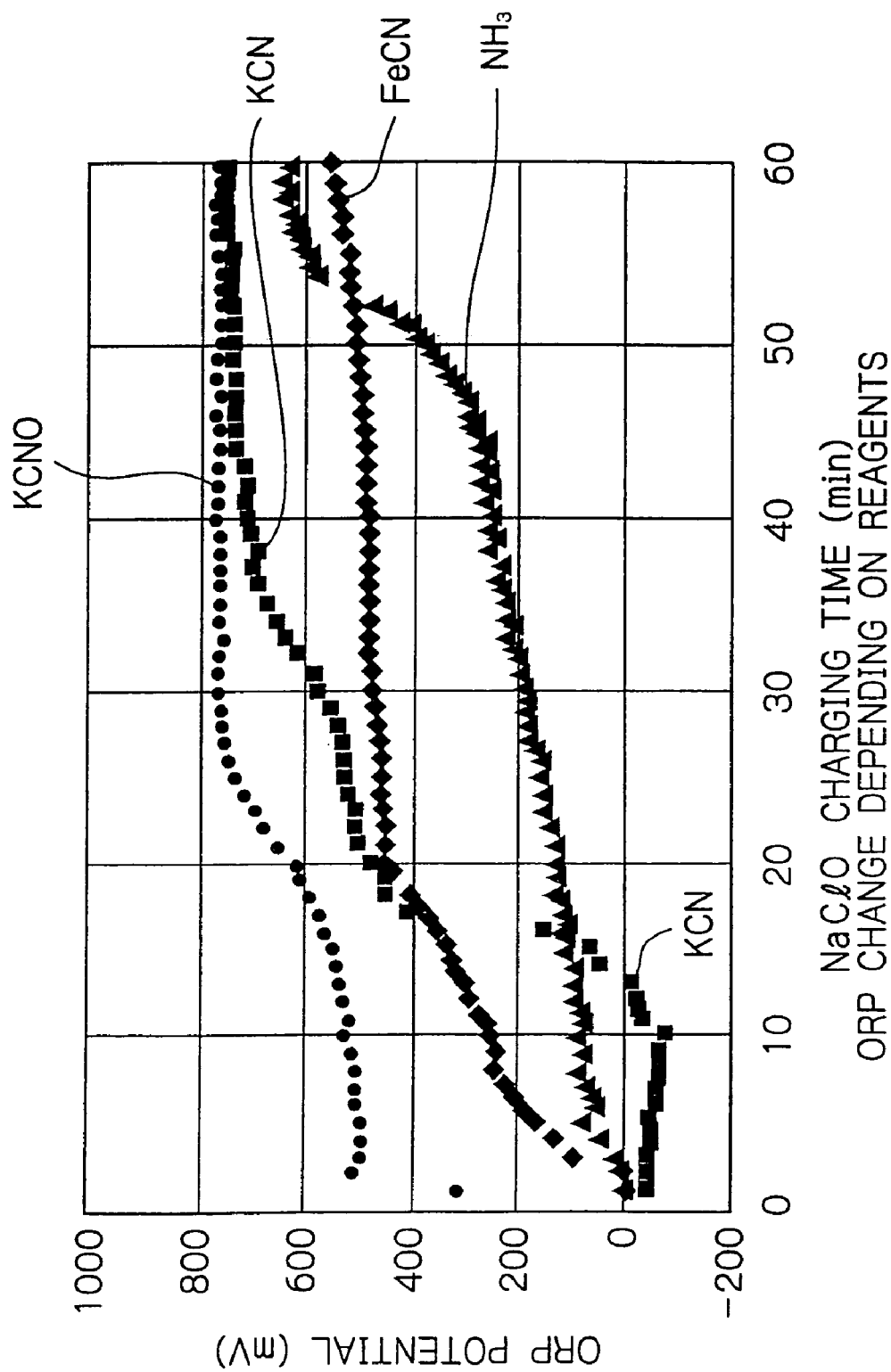
FIG. 1 is the oxidation-reduction potential curves of a solution of NaCN, NaCNO, $Na_4Fe(CN)_6$, $(NH_4)_2SO_4$, alone.

The present invention is hereinafter explained mainly with regard to an example of the salt-bath nitriding waste liquor in the following sequence. Most of the processing water, waste liquid, waste liquor and the like, that is, the processing subject of the present invention, are as follows: ① waste liquor of salt-bath nitriding method (components—total cyano matters, free cyano matters, reducing-type compound exhibiting volatility in the alkaline aqueous solution); ② general waste water (component—reducing type compound exhibiting volatility in the alkaline aqueous solution); ③ plating waste liquor (total cyano matters, free cyano matters). Hereinafter, an example of the intoxication of the waste liquor of salt-bath nitriding method is mainly described.

(1) Reaction Formulae
(2) Oxidation-Reduction Potential
(3) Temperature Dependence of Reactions
(4) pH Range
(5) Detection of Oxidation-Reduction Potential and Temperature
(6) Two-Step Method
(7) Single Step Method
(8) Theoretical Amount of Sodium Hypochlorite
(9) Regulated Value of Waste Water
(10) Detoxification of Solid Discard
(11) Decomposition of Valuable Metal Cyano-Flux
(12) Best Mode For Carrying Out Invention
   (a) Example 1 (two-step method, rinsing waste liquor of salt bath nitriding line)
   (b) Example 2 (two-step method, rinsing waste-liquor of salt bath nitriding line)
   (c) Example 3 (two-step method, removed sludge)
   (d) Example 4 (two-step method, plating waste-liquor)
   (e) Comparative Example 1 (conventional method, excessive chlorine method)
   (f) Comparative Example 2 (ditto)
   (g) Comparative Example 3 (ditto)
   (h) Example 5 (single step method, rinsing waste liquor of salt bath nitriding line)
   (i) Example 6 (single step method, removed sludge)
   (j) Examples 7, 8, 9 (single step method, plating waste-liquor, mixed waste liquor of plating waste liquor and Tufftride waste liquor, and low-concentration waste-liquor)
   (k) Comparative Examples 4, 5, 6 (addition methods of sodium hypochlorite: addition of the theoretical amount as a whole directly after heating, addition of the theoretical amount as whole before heating, and charging twice as high as the theoretical amount)
   (l) Example 10 (Treatment of Copper-Plating Waste-Liquor)
   (m) Example 11 (Aging)
(12) Applicability in Industry Reaction Formulae Salt-bath nitriding is a surface hardening method, in which iron parts are immersed in a molten salt-bath mainly composed of alkali cyanate and alkali carbonate and heated to approximately 580° C. to form a nitrided layer on the surface of the iron parts. When the iron parts are immersed in the salt bath mentioned above, the cyanic acid in the salt bath decomposes due to the catalytic reaction of the steel surface following the reaction below. The resultant nitrogen in the nascent state diffuses into the solid steel thereby advancing the nitriding.

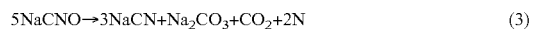

$$5NaCNO \rightarrow 3NaCN + Na_2CO_3 + CO_2 + 2N \quad (3)$$

Along with the treatment the cyanide formed by the reaction (3) accumulates in the salt bath.

In order to remove the salt deposited on the surface of the steel parts treated in the salt bath, they are rinsed in the subsequent water-rinsing process. The water-rinsing waste-liquor from the water-rinsing process contains, therefore, the sodium cyanate and alkali carbonate, which are the original salt-bath components, and additionally, cyanide (free cyano matters), ferrocyanides (cyano complexes) formed due to reaction between the cyanide and the steel surface, and ammonia, which is a decomposition product of the cyanate under the hydrolysis reaction (4)

$$NaCNO + 2H_2O \rightarrow CO_2 + NH_3 + NaOH \quad (4)$$

Such chlorine compounds as chlorine gas, bleaching powder, and sodium-hypochlorite aqueous-solution can be used, when the cyano complexes in the aqueous solution are oxidized and decomposed by chlorine. The chlorine gas is toxic gas and incurs danger during handling. The bleaching powder is powder and has difficulty in handling and is liable to form the calcium-carbonate scale. Its application to the treatment of waste-water is, therefore, limited. Desirably, the sodium-hypochlorite aqueous-solution is used in the light of safety and operability.

Therefore, it is presumed that the following reactions may occur, when the hypochlorite is caused to react with the rinsing waste-liquor discharged from the salt-bath nitriding.

① Oxidation of Cyanide to Cyanate $$NaCN + NaClO \rightarrow NaCNO + NaCl \quad (5)$$

② Decomposition of Cyanate formed by Equation (5)

$$2NaCNO + 3NaClO + H_2O \rightarrow 2CO_2 + N_2 + 2NaOH + 3NaCl \quad (6)$$

②' Decomposition of Unreacted Cyanate of Equation (4)

$$2NaCNO + 3NaClO + H_2O \rightarrow 2CO_2 + N_2 + 2NaOH + 3NaCl \quad (6')$$

③ Oxidation of Ferrocyanate to Ferricyanate $$2Na_2Fe(CN)_6 + NaClO + H_2O \rightarrow 2Na_3Fe(CN)_6 + 2NaOH + NaCl \quad (7)$$

④ Oxidation of Ferrycyanate to Cyanate $$Na_3Fe(CN)_6 + 6NaClO + 3NaOH \rightarrow Fe(OH)_3 + 6NaCNO + 6NaCl \quad (8)$$

⑤ Decomposition of Cyanate formed by Reaction (8)

$$2NaCNO + 3NaClO + H_2O \rightarrow 2CO_2 + N_2 + 2NaOH + 3NaCl \quad (6'')$$

⑤ Decomposition of Ammonia $$2NH_3 + 3NaClO \rightarrow N_2 + 3NaCl + 3H_2O \quad (9)$$

Oxidation-Reduction Potential

In order to obtain basic data of the dosage control by an ORP meter, the present inventors measured an oxidation-reduction potential curve of the above equations (5) through (9), the inventors prepared solutions containing NaCN, NaCNO, $Na_4Fe(CN)_6$, or $(NH_4)_2SO_4$, alone. The pH of the solutions was 11.5. The liquor temperature was maintained at 80° C. The solutions were titrated by the sodium hypochlorite solutions and the respective oxidation-reduction curves were obtained as shown in FIG. 1. The inflection points are shown in Table 1 (measurement electrode—a platinum electrode; the reference electrode is Ag/AgCl electrode).

TABLE 1

| Reagents | First Inflection Point | Second Inflection point | Third Inflection point |
|---|---|---|---|
| NaCN | 0~400 mV | 550~700 mV | — |
| NaCNO | 600~740 mV | — | — |
| $Na_4[Fe(CN)_6]$ | 0~220 mV | 250~450 mV | 550~600 mV |
| $(NH_4)_2SO_4$ | 300~600 mV | — | — |

The first inflection point of NaCN (0~400 mV) is the reaction end point of equation (5), in which cyanide is converted to cyanate. Incidentally, the cyanate formed by this reaction is non-toxic.

The second inflection point of NaCN (550~700 mV) is the reaction end point of equation (6), in which cyanate is oxidized to carbon dioxide and nitrogen.

The first inflection point of NaCNO (600~740 mV) is the reaction end point of equation (6), in which cyanate is converted to carbon dioxide and nitrogen as in the second inflection point of NaCN according to equation (6). Upon completion of the reaction, hypochlorite is present in small excess, so that its oxidation-reduction potential is detected.

The first inflection point of $Na_4[Fe(CN)_6]$ (0~220 mV) is the reaction end point of equation (7), in which ferrocyanate is oxidized to ferricyanate. Upon completion of the reaction, hypochlorite is present in small excess, so that its oxidation-reduction potential is detected.

The second inflection point of $Na_4[Fe(CN)_6]$ (250~450 mV) is the reaction end point of equation (8), in which ferricyanate is decomposed into cyanate and ferric hydroxide.

The third inflection point of $Na_4[Fe(CN)_6]$ (550~600 mV) is the reaction end point of equation (6), in which cyanate is decomposed into carbon dioxide and nitrogen as in the second inflection point of NaCN, i.e., equation (6), and the first end point of NaCNO.

The first inflection point of $(NH_4)_2SO_4$ (300~400 mV) is the reaction end point of equation (9), in which ammonia is oxidized and decomposed into nitrogen.

Temperature Dependence of Reactions

Figure 2:
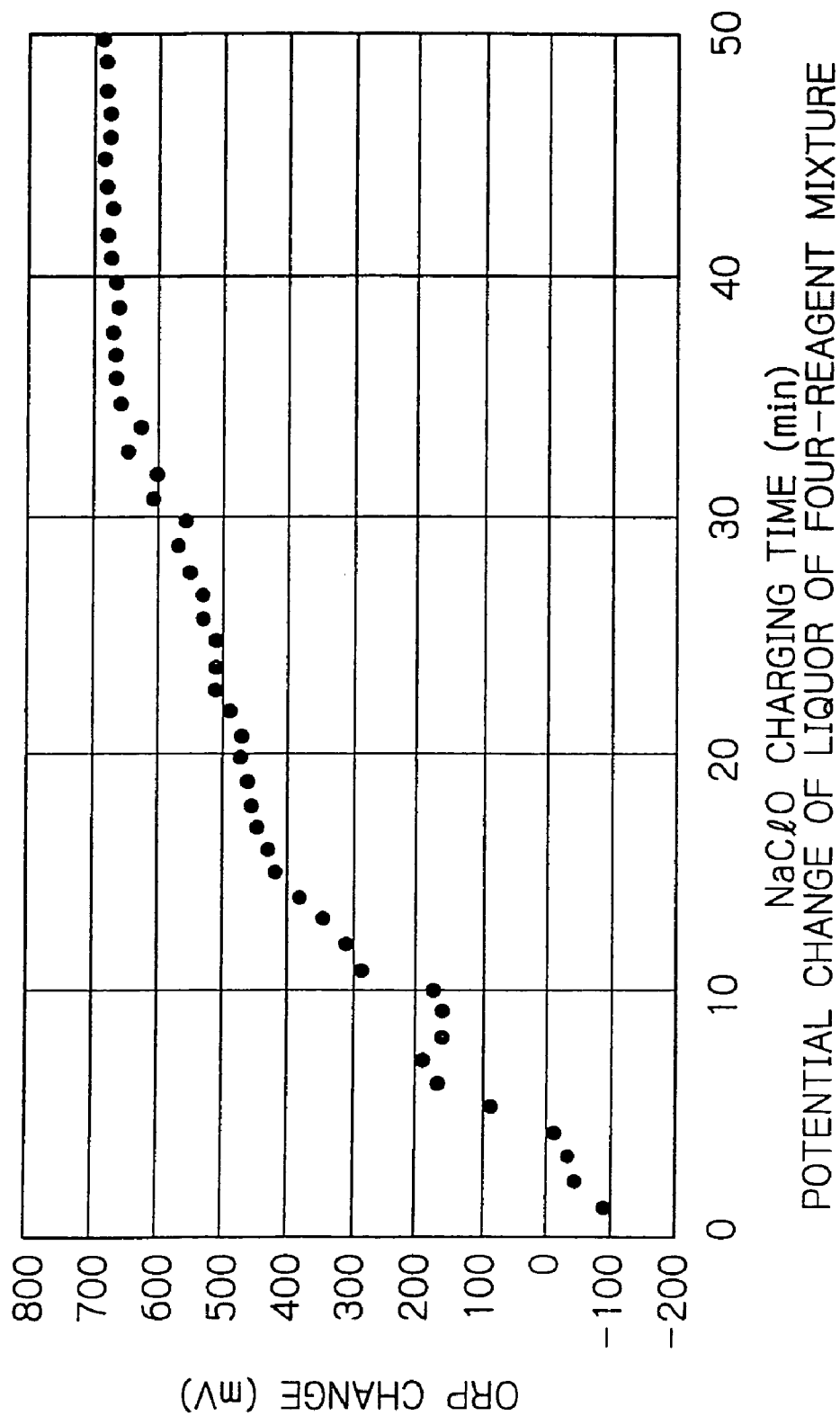
FIG. 2 is the oxidation-reduction potential curves of a mixed solution of NaCN, NaCNO, $Na_4Fe(CN)_6$, and $(NH_4)_2SO_4$.

The actual waste liquor is simulated in such a manner that the respective reagents of NaCN, NaCNO, or $Na_4Fe(CN)_6$ and $(NH_4)_2SO_4$ are mixed to prepare a solution having 11.5 of pH and 85° C. of temperature. This solution was titrated by the sodium hypochlorite aqueous solution. The oxidation-reduction potential during the titration was measured. The result is shown in FIG. 2. Three inflection points were recognized at ① 0~200 mV, ② 300~420 mV, and ③ 570~650 mV. These inflection points correspond to the following reactions, respectively.

Inflection Point ①: oxidation of ferrocyanate to ferricyanate and oxidation of cyanide to cyanate Inflection Point ②: decomposition of ammonia Inflection Point ③: decomposition of cyanate It is considered from Tables 1 and 2 that the temperature dependence of the reactions (5) through (9) is as follows.

Reaction (5) easily proceeds at room temperature.

Reaction (6) is extremely slow in alkali side at room temperature. Therefore, according to the most general detoxifying method of cyanides, i.e., the so-called alkali chlorine method, equations (1) and (5) are completed at pH>10, and then the pH is adjusted to 7~8 so as to perform the oxidation reaction of equations (2) and (6). This method is, therefore, referred to as the alkali-chlorine two-step method. When the pH is kept as pH>10 and temperature is elevated (80° C. or more), the reaction proceeds.

Reaction of equation (7) easily proceeds at room temperature.

Reaction of equation (8) does not take place at all at room temperature, but proceeds at 80° C. or more.

Reaction efficiency of equation (9) is low in an alkaline state at room temperature due to dissociation of hypochloric acid. The reaction proceeds at 60° C. or more.

Contrary to the inventors' discovery that reaction (5) easily proceeds at room temperature, Japanese Unexamined Patent Publication No. 50-118962, which discloses the heating-type alkali chlorine method, describes that a reaction to form hypochloric acid from hypochlorite (equation (4) in the publication) proceeds slowly at 80° C. or lower (page 272, right and lower column, lines 7~8 of the publication). The present inventors confirmed that the oxidation of ferrocyanate to ferricyanate takes place at low temperature. However, in Japanese Unexamined Patent Publication No. 50-118962, the oxidizing agent is not added at low temperature but is added at high temperature of 80~95° C. (c.f., page 272, right and upper column-left and lower column, line 2)

pH Range

When the waste-water containing the cyano complexes is subjected to decomposition by sodium hypochlorite, pH must be maintained in an alkaline side. When the waste water is acidic, there is a danger that the sodium hypochlorite is decomposed, thereby generating chlorine gas.

In most cases, the waste-water contains free cyano matters. The aqueous solution containing the free cyano matters must be maintained alkaline (pH 8~14, desirably 9~14) so as to prevent the generation of toxic HCN (cyano gas).

For the reasons described hereinabove, the starting water to be treated by the present invention is necessarily maintained alkaline.

When the cyano complexes contained in the rinsing water of salt-bath nitriding are subjected to decomposition, the oxidation-reduction potential of the respective reactions is measured. When the decomposition of the cyano complexes completes, the cyanic acid has been completely decomposed, and the potential shows that (550~740 mV) of the sodium hypochlorite is present in excess. The dosing of the sodium hypochlorite is stopped when the oxidation-reduction potential reaches this value, thereby enabling the dosing control by an ORP meter. The oxidation-reduction potential curve of this reaction is influenced by pH and shows a distinct inflection point in the pH range of 9~13.5. At less than pH 9, the potential shows hunting and is thus instable. At more than pH13.5, the change of potential is so slight that the inflection point is not distinct and the dosing control becomes difficult. The waste-water to be treated must, therefore, be maintained in a pH range of 9~13.5.

Detection of Oxidation-Reduction Potential and Temperature

In the present invention, the following reactions are caused to fully proceed based on the considerations above, at lower than 80° C.: the reaction of equation (5), i.e., the oxidation of cyanide to cyanate, which proceeds at low temperature, the oxidation-reduction potential at the completion of the reaction=approximately 250 mV; the reaction of equation (7), i.e., the oxidation of ferrocyanide to ferricyanide, the oxidation-reduction potential at the completion of the reaction=approximately 200 mV; and, the reaction of equation (9), i.e., the decomposition of ammonia, the oxidation-reduction potential at the completion of the reaction=approximately 400 mV. As a result, the ammonia and free cyano matters, which involve a danger of vaporizing, are preliminarily decomposed at a low temperature, thereby preventing vaporization of the unreacted ammonia and cyano gas from the alkaline waste liquor. In the low-temperature step described above, one or more of the plurality of oxidation-reduction potentials mentioned above may be set as the setting potential, and the oxidation-reduction potential(s) is detected and the addition of hypochlorite may be controlled in such a manner that the hypochlorite is added when the measured potential is lower than the setting potential.

Subsequently, the temperature is elevated to 80° C. or more, and the temperature is maintained in a high-temperature range of 80° C. or more and the boiling point or less, so as to carry out the reaction of equation (6), i.e., the decomposition of the cyanate, which proceeds slowly or does not proceed unless at high temperature, the oxidation-reduction potential at the completion of the reaction=approximately 650 mV; and the reaction of equation (8), i.e., the decomposition of ferricyanide to cyanate, the oxidation-reduction potential at the completion of the reaction=approximately 300 mV. Although in the reaction of equation (9), i.e., the decomposition of ammonia, the oxidation-reduction potential at the completion of the reaction=approximately 800 mV; can be completed at low temperature (40~80° C.), it is possible to complete the reaction of the residual part of ammonia at high temperature, which reaction does not complete at low temperature. After the treatment in the low-temperature process, the hypochlorite is again added, thereby preventing its self-decomposition.

The oxidation-reduction potential of the waste liquor after the salt-bath nitriding is generally –100~+100 mV in most cases.

In the present invention, the oxidation-reduction potential of the treated waste liquor is detected while the temperature is elevated and maintained in the high-temperature range as described above, and the addition of hypochlorite is ended when and after the oxidation-reduction potential of hypochlorite is detected.

The oxidation-reduction potential of the hypochlorite under the alkaline state, which is measured by the measuring electrode and the reference electrode mentioned above, is generally 600~700 mV but may somewhat vary depending on the kind of the treated waste liquor. Preferably, the oxidation-reduction potential is actually measured in the laboratory prior to the treatment. However, in practice, the hypochlorite is continuously added, the temperature-elevation and maintenance is continued, and it can be judged that the oxidation-reduction potential of the hypochlorite is detected, when the oxidation-reduction potential reaches a constant value in the range of 600~700 mV, mentioned above.

In addition, the maintenance in the high-temperature range is carried out by means of holding the temperature of waste liquor in the temperature-range of 80° C. the boiling point, specifically, holding at, for example, 95° C. for 1 hour.

Two-Step Method

In the present invention, the two-step method may be carried out in such a manner that the reactions (5), (7) and (9) are essentially completed in the low-temperature step at 80° C. or lower, and subsequently the liquor temperature is elevated to 80° C. or more so as to carry out the reactions (6) and (8). Ammonia is decomposed in the low-temperature stage by this method.

In the heating-type alkali-chlorine method, the top part of a decomposition reaction-tank is open. However, in the method according to the present invention, the possibility of vaporization of the unreacted ammonia is not completely ruled out, therefore, the reactor must be of such a structure that no gas leaks externally.

In the two-step method according to the present invention, the setting temperature and the setting potential are first input in the low-temperature mode, and the rinsing waste liquor in the reaction tank is heated from room temperature to the setting temperature.

First, the oxidation-reduction potential is set at the ammonia decomposition potential of equation (9), which exhibits the highest inflection point in the reactions (5), (7) and (9) of the low-temperature range. The ammonia decomposition potential is usually approximately 400 mV but may not necessarily be of this value depending upon the waste liquor. This potential should therefore be preliminarily confirmed. The reaction of equation (5) proceeds at room temperature. In addition, the reaction of equation (9) is slow at room temperature but is accelerated with the rise of temperature. The dosing of hypochlorite should therefore be desirably started from room temperature from the viewpoint that the decomposition treatment time is shortened and further vaporizing of the harmful gases is prevented.

When the reactions of the low-temperature region proceed to such a level that the measured potential stably arrives at the setting potential, at this point, the low-temperature mode is shifted to the high-temperature mode. That is, the setting temperature is changed to a value in the high-temperature region, and simultaneously, the setting potential is changed to a value in the high-temperature region. Namely, this value is the potential of the hypochlorite, which appears after completion of the decomposition of the cyanic acid according to reaction (6), which has higher inflection potential in the high-temperature reactions according to the equations (6) and (8). The potential of hypochlorite is usually approximately 650 mV but may not necessarily be of this value depending upon the waste liquor. This potential should therefore be preliminarily confirmed. When the reactions in the high-temperature region proceed with the result that the measured potential reaches the setting potential, then, dosing of the hypochlorite is stopped.

Single Step Method

In the present invention, the reactions (5), (7) and (9) as well as the reactions (6) and (8) can be successively carried out during the temperature-elevation step from room temperature to high-temperature of from 80° C. to boiling point and during the temperature-holding step.

Figure 3:
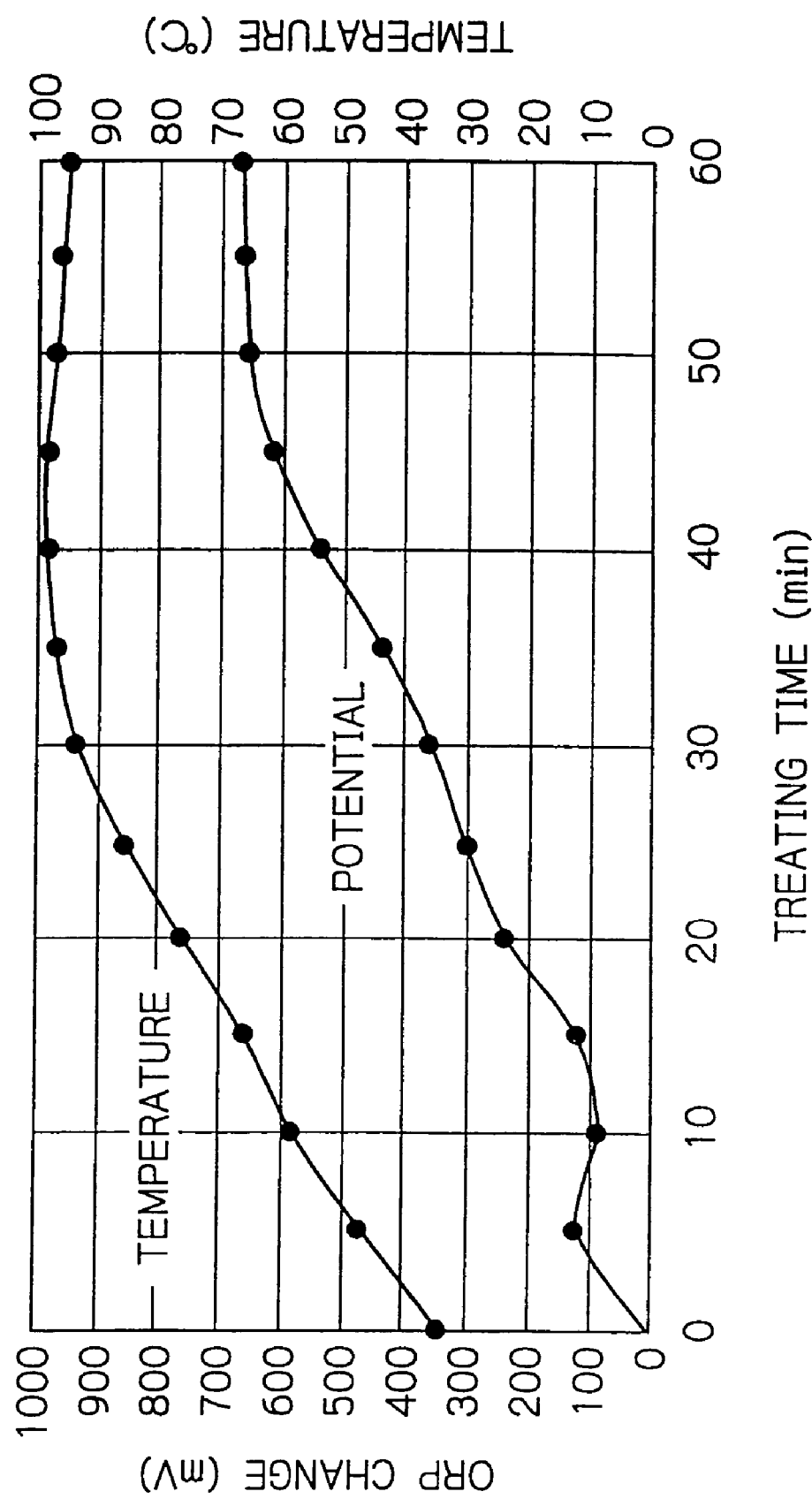
FIG. 3 is a graph showing the time change in the oxidation-reduction potential and temperature.
Figure 4:
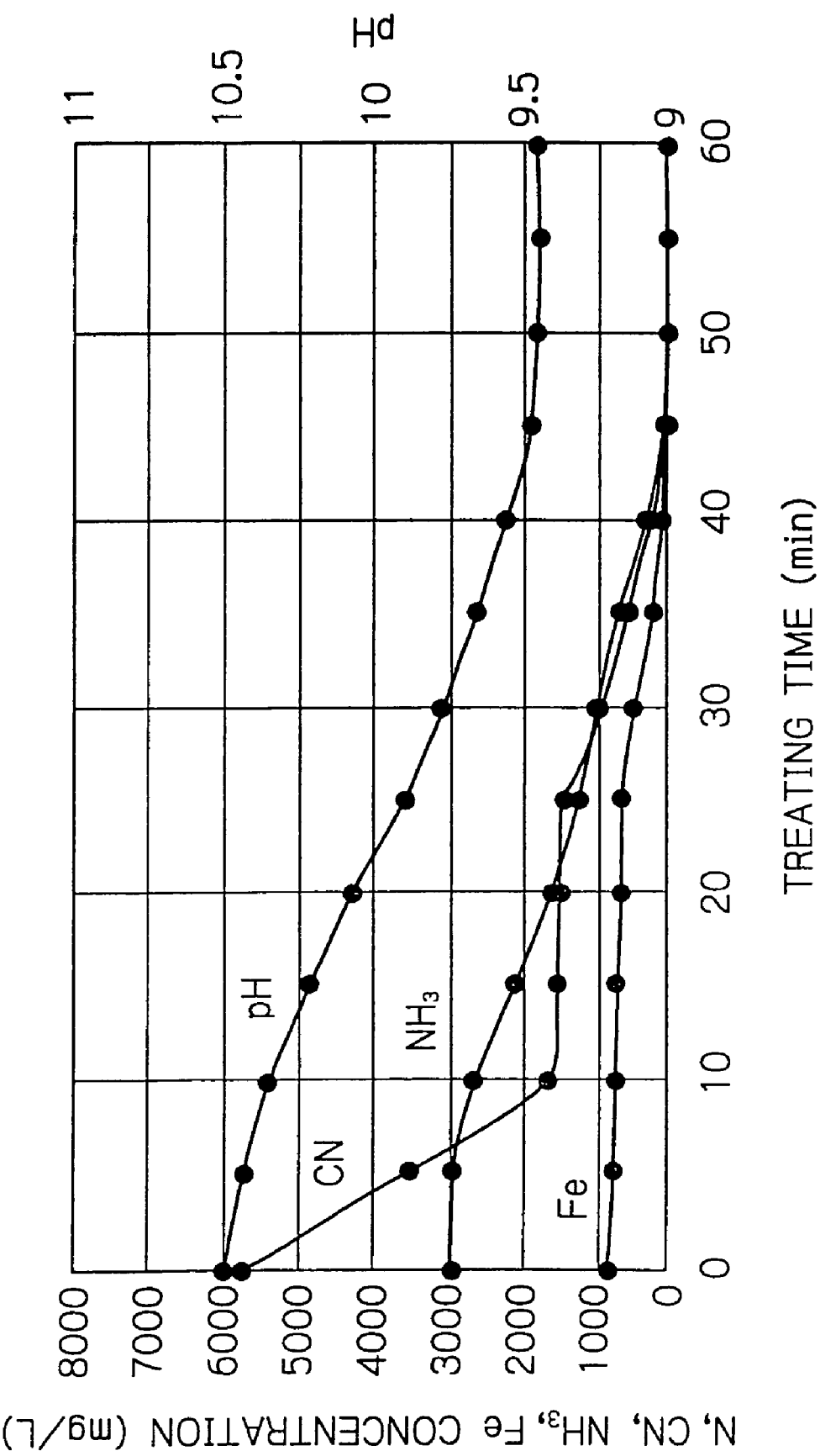
FIG. 4 is a graph showing the time change in the CN, $NH_3$ and Fe concentrations and pH.

An embodiment of the single step method is illustrated in FIGS. 3 and 4. In FIG. 3, the abscissa is the treating time (minutes), the ordinate (left side) is the oxidation-reduction potential (mV), and the ordinate (right side) is the temperature (° C.). In FIG. 4, the abscissa is the treating time (minutes), the ordinate (left side) is the concentration (mg/L) of CN, $NH_3$, and Fe, and the ordinate (right side) is pH. The hypochlorite was continuously added so that the total amount is as high as 1.05 times the theoretical amount.

① Decomposition of CN (total cyano matters). While the temperature is elevated to approximately 60° C., the first-step decomposition corresponding to reaction equation (5) occurs in 10 minutes. The CN concentration is subsequently kept constant during the period of 10~25 minutes. Further, the CN concentration again decreases along with the decomposition of ferricyanide in the treatment after 25 minutes.

② $NH_3$ During the period of longer than 5 minutes and up to 45 minutes, this concentration continuously decreases along with the temperature elevation from about 45° C. to the boiling point. This corresponds to equation (9).

③ Oxidation Reaction of Ferrocyanide to Ferricyanide. This corresponds to equation (7) and does not show any change in the Fe concentration.

④ Decomposition Reaction of Ferricyanide. This reaction corresponds to equation (8) and proceeds in the treating time of 25 minutes or longer and results in a change in the Fe concentration.

⑤ Change in Oxidation-Reduction Potential (ORP). The oxidation-reduction potential gradually increases and becomes a constant value at 50 minutes or later. In the present experiment, the oxidation-reduction potential of hypochlorite is preliminarily evaluated to be 670 mV. Addition of hypochlorite is continued up to 50 minutes. As an alternative method, the constant oxidation-reduction potential is confirmed in 50~60 minutes, and the addition of hypochlorite may be terminated at 60 minutes. In this method, the hypochlorite added in the period of 50~60 minutes is excessive relative to equation (9).

⑥ Color Change of Waste Liquor. After a lapse of 10 minutes, brown coloring starts. After a lapse of 20 minutes, red-brown precipitation occurs. Subsequently, the color changes from red, to brown and to yellow. Through this change, the complete decoloration to transparency occurs in 50 minutes.

⑦ Change in pH. This corresponds also to the change in oxidation-reduction potential, and pH lowers from 10.5 and arrives at constant pH 9.5

⑧ Temperature. Temperature rises from room temperature to approximately 95° C. in 40 minutes. Subsequently, the temperature is held at a constant level.

Theoretical Amount of Sodium Hypochlorite

The theoretical amount of sodium hypochlorite, which is required for decomposing such main components of the salt-bath nitriding waste-liquor as free cyano matter, cyanic acid, ammonia and ferrocyanate ions, is as shown in Table 2 following the equations (5)~(9). In the present invention, the sodium hypochlorite can be continuously or intermittently added within the treating time of, for example, 60~120 minutes, so that the total addition amount is 1.01~1.05 times as high as the theoretical amount.

TABLE 2

| Material | Using Amount of NaClO (Theoretical Amount) |
|---|---|
| Free Cyano Matter | 7.16 g/CN(1 g) |
| $CNO^-$ | 2.66 g/$CNO^-$(1 g) |
| $NH_3$ | 7.98 g/CN(1 g) |
| $Fe(CN)_6^{4-}$ | 7.40 g/CN(1 g) |

Regulated Value of Waste Water

The regulated value of total cyano matters according to the waste-water standard varies in the countries. In most of the occidental states and Japan, the regulated value is 1 ppm or less. In Asian states, the regulated value is 0.5 ppm or less in China, 0.2 ppm or less in Thailand, and 0.04 ppm or less in Indonesia.

Under the circumstances described above, it is urgent to establish such a treatment method to be implemented in Asian regions that at least 0.1 ppm can be ensured.

Detoxification of Solid Discard

It is necessary in the salt-bath nitriding not only to treat the rinsing waste-liquid but also to periodically remove sludge, i.e., the insoluble iron compound which increases in the salt bath along with the treatment. Consequently, solid discard including cyanide generates. This solid discard (hereinafter referred to as "the removed sludge") is the specifically regulated industrial discard and its treatment is usually consigned outside. The removed sludge has, therefore, been an impediment to the achievement of a toxic-matter free plant. Since the removed sludge is pumped out from the salt bath, it is mainly composed of the components of the salt bath and is water-soluble.

The present inventors make it possible to attain almost zero discharging of the specifically regulated industrial discard from a salt bath nitriding-plant by means of dissolving and dispersing the removed sludge in the rinsing waste-water and subjecting it to the detoxification treatment according to the present invention.

Decomposition of Cyano Complex of Valuable Metals

Such valuable metals as Au, Ag, Cu and Zn are plated even today by using the cyano plating-bath. Since every one of these metal cyano-complexes has a higher dissociation constant than that of the iron cyano-complex, NaClO can decompose CN of the former complex under an alkaline state and at high temperature.

TABLE 3

| Chemical Form | Complex Ion | Dissociation Constant |
|---|---|---|
| $Na_2Zn(CN)_4$ | $Zn(CN)_4^{2-}$ | $1.3 \times 10^{-17}$ |
| $Na_2Cd(CN)_4$ | $Cd(CN)_4^{2-}$ | $1.4 \times 10^{-19}$ |
| $Na_3Ag(CN)_4$ | $Ag(CN)_4^{3-}$ | $2.1 \times 10^{-21}$ |
| $Na_2Ni(CN)_4$ | $Ni(CN)_4^{3-}$ | $1.0 \times 10^{-22}$ |
| $Na_3Cu(CN)_4$ | $Cu(CN)_4^{3-}$ | $5.0 \times 10^{-28}$ |
| $Na_2Au(CN)_4$ | $Au(CN)_4^{3-}$ | $5.0 \times 10^{-39}$ |
| $K_4Fe(CN)_6$ | $Fe(CN)_6^{4-}$ | $1.3 \times 10^{-35}$ |
| $K_4Fe(CN)_6$ | $Fe(CN)_6^{3-}$ | $1.3 \times 10^{-42}$ |

When sodium hypochlorite is added to the cyano plating waste-liquor containing valuable metals, reactions as shown in equations (10) through (21) proceed at high temperature.

1) Ag Cyano Complex $$Na_3Ag(CN)_4 + 4NaClO \rightarrow AgCl + 4NaCNO + 3NaCl \quad (10)$$

$$2NaCNO + 3NaClO + H_2O \rightarrow 2NaHCO_3 + N_2 + 3NaCl \quad (11)$$

(10)+(11)

$$Na_3Ag(CN)_4 + 10NaClO + 2H_2O \rightarrow AgCl + 4NaHCO_3 + 2N_2 + 4NaOH + 9NaCl \quad (12)$$

2) Monovalent Metal-Ion Complex $$Na_3Me(CN)_4 + 4NaClO + NaOH \rightarrow Me(OH) + 4NaCNO + 4NaCl \quad (13)$$

$$2NaCNO + 3NaClO + H_2O \rightarrow 2NaHCO_3 + N_2 + 3NaCl \quad (14)$$

(13)+(14)

$$Na_3Me(CN)_4 + 10NaClO + NaOH + 2H_2O \rightarrow Me(OH) + 4NaHCO_3 + 2N_2 + 10NaCl \quad (15)$$

$$2Me(OH) \rightarrow Me_2O + H_2O \quad (16)$$

3) Divalent Metal Ion Complex $$Na_2Me(CN)_4 + 4NaClO + 2NaOH \rightarrow Me(OH)_2 + 4NaCNO + 4NaCl \quad (17)$$

$$2NaCNO + 3NaClO + H_2O \rightarrow 2NaHCO_3 + N_2 + 3NaCl \quad (18)$$

(17)+(18)

$$Na_2Me(CN)_4 + 10NaClO + 2H_2O + 2NaOH \rightarrow Me(OH)_2 + 4NaHCO_3 + 2N_2 + 10NaCl \quad (19)$$

$$Me(OH)_2 \rightarrow MeO + H_2O \quad (20)$$

4) Au Cyano Complex $$Na_3Au(CN)_4 + 4NaClO \rightarrow NaAuCl_2 + 4NaCNO + 2NaCl \quad (21)$$

$$4NaCNO + 6NaClO + 2H_2O \rightarrow 2N_2 + 4CO_2 + 4NaOH + 6NaCl \quad (22)$$

$$Na_3Au(CN)_4 + 10NaClO + 2H_2O \rightarrow NaAuCl_2 + 2N_2 + 4NaHCO_3 + 8NaCl \quad (23)$$

In the present invention, gold is neither precipitated nor deposited in the form of hydroxide or oxide under the co-presence of an oxidizing agent, and is present in the solution in the form of gold chloric acid. Contrary to this, silver and most of the other metals are present in the form of silver chloride or metal oxide. Gold can therefore be separated alone.

The reaction equations are the same as in the ordinary alkali chlorine method and consist of the first oxidation according to equations (10), (13), (17) and (21) in which cyano matter is converted to cyanic acid, and the second oxidation according to equations (11), (14), (18) and (23), in which the cyanic acid is converted to nitrogen gas and carbonate. These reactions occur continuously in most cases under high temperature. Equations (10)~(12) indicate that the Ag cyano complex reacts as described above and precipitates and deposits as AgCl. The monovalent metal and divalent metal are converted under high temperature and copresence of oxidant to metal oxide as shown in equations (16) and (20), respectively. From equations (12), (15) and (19), it turns out that 4 moles of CN and 10 moles of NaClO react. That is, 7.16 g of NaClO is necessary for 1 g of CN.

The present invention is hereinafter described with reference to the examples.

BEST MODE FOR CARRYING OUT INVENTION

Figure 5:
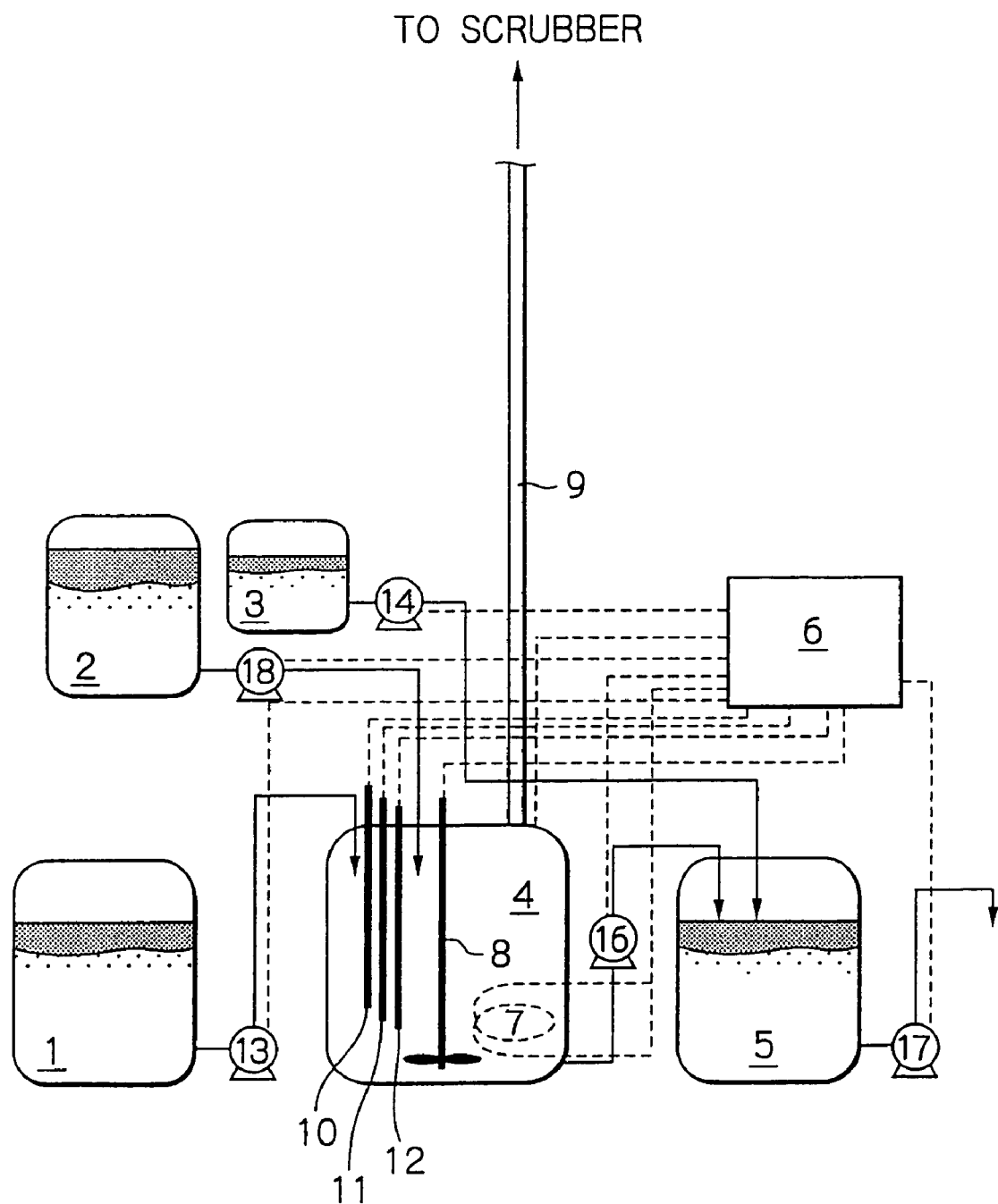
FIG. 5 shows the apparatus and flow for carrying out the method of the present invention.

Rinsing waste liquor discharged from a salt-bath nitriding line can be treated by means of the apparatus, the flow chart of which is shown in FIG. 5, utilizing the single-step method and the two-step method according to the present invention.

In the drawing, 1 is a storage tank of the original waste liquor, 2 is a reagent tank (hypochlorite solution), 3 is a reagent tank (sulfuric acid tank), 4 is a reaction tank, 5 is a tank of treating liquor combined with a neutralizing tank, 6 is a control panel. 7 is a heater for heating the treating liquor. The heater 7 used in the present example does not limit the heating apparatus, as long as it can be effectively used in the place of installation. For example, either vapor or gas may be used. 8 is a stirrer. 9 is a duct which is connected with a scrubber for collecting the generated ammonia gas. 10, 11 and 12 are sensors for measuring the temperature, pH and ORP, respectively. 13, 14, 16~18 are liquor-conveying pumps. The pump 18 is preferably a continuous flow pump. The reaction tank 4 is of closed structure.

Example 1

The two-step method according to the present invention was carried out using the apparatus, the flow chart of which is shown in FIG. 5, with regard to the rinsing waste-liquor, which was discharged from the salt-bath nitriding line.

The analysis results of the rinsing waste-liquor are shown in Table 4.

The above-mentioned waste liquor in an amount of 1 m³ was admitted in the reaction tank 4 of FIG. 5. The treatment was started at the setting temperature of 79° C. and setting potential of 350 mV. At the start, the temperature and oxygen-reduction potential (ORP) were 25° C. and −71 mV, respectively.

When the measured potential was lower than the setting potential, 10% sodium-hypochlorite aqueous solution was intermittently dosed from the reagent tank 2 into the reaction tank 4 by means of the continuous flow pump 18 having 10 L/minute of capacity. The temperature of the liquor reached the setting temperature of 79° C. after 25 minutes from the start. The oxygen-reduction potential (ORP) reached the setting potential after 30 minutes from the start.

When the measured potential reached the setting potential, the setting temperature was changed to 95° C. and the setting potential was changed to 600 mV, in order to shift to the high-temperature mode. The 10% sodium-hypochlorite aqueous solution was intermittently dosed by means of the continuous flow pump 18. The oxidation-reduction potential (ORP) reached 600 mV in 95 minutes in total from the start. In order to achieve the decomposition of sodium hypochlorite present in small excess, the heating was stopped and only the stirring was continued for 25 minutes. Subsequently, the liquor was transferred by means of the pump 16 into the neutralizing tank 5, and 10% sulfuric acid was dosed from the reagent tank 3 into the neutralizing tank 5 to provide pH 8.5. The supernatant liquor was sampled for analysis. The results of the experiment are described in Table 4.

The analytical results show that the total cyano matters are less than 0.1 mg/L, and further ammoniacal nitrogen was not detected. The dosing amount of the sodium hypochlorite was 1.03 times as high as the theoretical value calculated from the analytical value of the waste liquor.

Example 2

The two-step method according to the present invention was carried out using the apparatus, the flow chart of which is shown in FIG. 5, with regard to the rinsing waste liquor, which was discharged from the salt-bath nitriding line.

The analysis results of the rinsing waste liquor are shown in Table 4.

The above-mentioned waste liquor in an amount of 1 m³ was admitted in the reaction tank 4 of FIG. 5. The treatment was started at the setting temperature of 75° C. and setting potential of 400 mV. At the start, the temperature and oxygen-reduction potential (ORP) were 24° C. and −65 mV, respectively.

When the measured potential was lower than the setting potential, the 10% sodium-hypochlorite aqueous solution was intermittently dosed from the reagent tank 2 into the reaction tank 4 by means of the continuous flow pump 18 having 10 L/minute of capacity. The temperature of the liquor reached the setting temperature of 75° C., after t23 minutes from the start.

When the measured potential reached the setting potential, the setting temperature was changed to 95° C. and the setting potential was changed to 600 mV, in order to shift to the high-temperature mode. The oxidation-reduction potential (ORP) reached 600 mV in 100 minutes in total from the start. In order to achieve the decomposition of sodium hypochlorite present in small excess, the heating was stopped and only the stirring was continued for 20 minutes. Subsequently, the liquor was transferred by means of the pump 16 into the neutralizing tank 5, and 10% sulfuric acid was dosed from the reagent tank 3 into the neutralizing tank 5 to provide pH 8.5. The supernatant liquor was sampled for analysis. The results of the experiment are described in Table 4.

The analytical results show that the total cyano matters are less than 0.1 mg/L, and further ammoniacal nitrogen was not detected (indicated as ND in the table). The dosing amount of the sodium hypochlorite was 1.05 times as high as the theoretical value calculated from the analytical value of the waste liquor.

Example 3

Removed sludge in an amount of 50 kg from the rinsing step of the nitriding salt-bath, was dissolved in the waste liquor from the rinsing process to provide waste liquor in an amount of 1 m³. The two-step method according to the present invention was carried out.

This waste liquor in an amount of 1 m³ was admitted in the reaction tank 4 of FIG. 5. The analysis results of the rinsing waste liquor are shown in Table 4.

The treatment was started at the setting temperature of 70° C. and setting potential of 330 mV. At the start, the temperature and oxygen-reduction potential (ORP) were 25° C. and −52 mV, respectively.

When the measured potential was lower than the setting potential, the 10% sodium-hypochlorite aqueous solution was intermittently dosed from the reagent tank 2 into the reaction tank 4 by means of the continuous flow pump 18 having 10 L/minute of capacity. The temperature of liquor reached setting temperature of 70° C., after 20 minutes from the start.

When the measured potential reached the setting potential, the setting temperature was changed to 85° C. and the setting potential was changed to 650 mV, so as to shift to the high-temperature mode. The oxidation-reduction potential (ORP) reached 650 mV in 93 minutes in total from the start. In order to achieve decomposition of sodium hypochlorite present in small excess, the heating was stopped and only the stirring was continued for 7 minutes. Subsequently, the liquor was transferred by means of the pump 16 into the neutralizing tank 5, and 10% sulfuric acid was dosed from the reagent tank 3 into the neutralizing tank 5 to provide pH 7.7 The supernatant liquor was sampled for analysis. The results of the experiment are described in Table 4.

The analytical results show that the total cyano matters are less than the limits of detection, and further ammoniacal nitrogen was not detected. The dosing amount of the sodium hypochlorite was 1.05 times as high as the theoretical value calculated from the analytical value of the waste liquor.

TABLE 4

|  | Items | Example 1 | Example 2 | Example 3 |
| --- | --- | --- | --- | --- |
| Before Treatment | PH | 11.4 | 11.0 | 11.1 |
|  | Free Cyano Matters (mg/L) | 2200 | 500 | 250 |
|  | Total Free Cyano matters (mg/L) | 3250 | 1200 | 880 |
|  | Cyanic Acid (mg/L) | 3200 | 3000 | 3320 |
|  | Ammoniacal Nitrogen (mg/L) | 1380 | 290 | 300 |
|  | Total Nitrogen (mg/L) | 1860 | 500 | 650 |
| Treatment Conditions | Low-Temperature Range Setting Temperature (° C.) | 79 | 75 | 70 |
|  | High-Temperature Range Setting Temperature (° C.) | 95 | 95 | 85 |

TABLE 4-continued

| | Items | Example 1 | Example 2 | Example 3 |
|---|---|---|---|---|
| | Low-Temperature Range Setting Potential (mV) | 350 | 400 | 330 |
| | High-Temperature Range Setting potential (mV) | 600 | 600 | 650 |
| | Dosage Amount of Sodium Hypochlorite (Relative Amount of Theoretical Amount) | 1.03 | 1.05 | 1.05 |
| | Treating Time (minutes) | 120 | 120 | 120 |
| After Treatment | PH | 8.4 | 8.5 | 7.7 |
| | Total Cyano Matters (mg/L) | <0.1 | <0.1 | not detected |
| | Ammoniacal Nitrogen (mg/L) | ND | ND | ND |
| | Total Nitrogen (mg/L) | 200 | 90 | 0 |

Example 4

The silver-cyanide plating waste-liquor having the composition shown in Table 5, discharged from the plating plant, was subjected to the detoxification treatment according to the two-step method of the present invention. The plating waste liquor in an amount of 1 m$^3$ was admitted in the reaction tank 4 of FIG. 5.

The treatment was started at the setting temperature of 79° C. and the setting potential of 250 mV. At the start, the temperature and oxygen-reduction potential (ORP) were 23° C. and −92 mV, respectively.

When the measured potential was lower than the setting potential, the 10% sodium-hypochlorite aqueous solution was intermittently dosed from the reagent tank 2 into the reaction tank 4 by means of the continuous flow pump 18 having 10 L/minute of capacity. The temperature of the liquor reached the setting temperature of 79° C., after 26 minutes from the start. The oxygen-reduction potential (ORP) reached the setting potential after 30 minutes from the start.

When the measured potential reached the setting potential, the setting temperature was changed to 95° C. and the setting potential was changed to 660 mV, so as to shift to the high-temperature mode. The 10% sodium hypochlorite aqueous solution was continuously added by the continuous flow pump 18. The oxidation-reduction potential (ORP) reached 660 mV in 95 minutes in total from the start. In order to achieve the decomposition of sodium hypochlorite present in small excess, the heating was stopped and only the stirring was continued for 25 minutes. Subsequently, the 10% sulfuric acid was dosed for neutralizing into tank 5 to provide pH 8.0. The supernatant liquor was sampled for analysis. The results of experiment were described in Table 5.

The analytical results shows that the total cyano matters are less than 0.1 mg/L, and further ammoniacal nitrogen was not detected. The dosing amount of the sodium hypochlorite was 1.02 times as high as the theoretical value calculated from the analytical value of the waste liquor.

TABLE 5

| | Items | Example 4 |
|---|---|---|
| Before Treatment | pH | 12.5 |
| | Total Free Cyano Matters (mg/L) | 10600 |
| | Silver (mg/L) | 4900 |
| | Total Nitrogen (mg/L) | 550 |

TABLE 5-continued

| | Items | Example 4 |
|---|---|---|
| Treatment Conditions | Low-Temperature Range Setting Temperature (° C.) | 79 |
| | High-Temperature Range Setting Temperature (° C.) | 95 |
| | Low-Temperature Range Setting Potential (mV) | 250 |
| | High-Temperature Range Setting Potential (mV) | 660 |
| | Dosage Amount of Sodium Hypochlorite (Relative Amount to Theoretical Amount) | 1.02 |
| | Treating Time (minutes) | 120 |
| After Treatment | pH | 8.0 |
| | Total Cyano Matters (mg/L) | ND |
| | Ammoniacal Nitrogen (mg/L) | 0.5 |
| | Total Nitrogen (mg/L) | ND |

Comparative Example 1

As a comparative example, the rinsing waste-liquor, which was discharged from the salt-bath nitriding line, was treated by the conventional method, i.e., the excess chlorine method (the method, in which excess oxidizing agent more than the theoretical method is dosed in a constant amount at the beginning, referred to in "Techniques and Rules for Preventing Environmental Pollution" (ditto)).

The waste liquor in 5 L, which belonged to the same lot as that used in Example 1, was admitted in a stainless-steel beaker in 10 L. While the waste liquor was being stirred with a stirrer, the sodium hypochlorite aqueous solution (10% solution) in an amount as high as 1.05 times that calculated from the analytical value was charged into the waste liquor. Temperature-rise was then started. After 20 minutes, the temperature reached the predetermined temperature 90° C. The temperature was then maintained for 100 minutes to perform the oxidizing decomposition (the reaction time being 120 minutes)

After the completion of oxidizing decomposition, the supernatant liquor was sampled for analysis. The analysis results of the treating liquor are shown in Table 6.

The analytical results show that the total cyano matters of the liquor, which has been treated by the above method, was 26.0 mg/L more than the waste-liquor regulating value of 1 mg/L. Although the ammoniacal nitrogen was not detected, since the ammonia odor was detected during treatment, it is clear that a part of the ammonia vaporized into the atmospheric air.

Comparative Example 2

The waste liquor in 5 L, which belonged to the same lot as that used in Example 1, was admitted in a stainless-steel beaker in 10 L. While the waste liquor was being stirred with a stirrer, sodium hypochlorite aqueous solution (10% solution) in an amount as high as 1.5 times that calculated from the analytical value was charged into the waste liquor. Temperature-rise was then started. After 20 minutes, the temperature reached the predetermined temperature 90° C. The Temperature was then maintained for 100 minutes to perform the oxidizing decomposition.

After the completion of oxidizing decomposition, the supernatant liquor was sampled for analysis. The analysis results of the treating liquor are shown in Table 6.

The analytical results show that the total cyano matters of the liquor, which has been treated by the above method, was 3.0 mg/L more than the waste-liquor regulating value of 1 mg/L. Although the ammoniacal nitrogen was not detected, since the ammonia odor was detected during treatment, it is clear that a part of the ammonia vaporized into the atmospheric air.

Comparative Example 3

The waste liquor in 5 L, which belonged to the same lot as that used in Example 1, was admitted in a stainless-steel beaker in 10 L. While the waste liquor was being stirred with a stirrer, sodium hypochlorite aqueous solution (10% solution) in an amount as high as 2.0 times that calculated from the analytical value was charged into the waste liquor. Temperature-rise was then started. After 20 minutes, the temperature reached the predetermined temperature 90° C. Temperature was then maintained for 100 minutes to perform the oxidizing decomposition.

After the completion of oxidizing decomposition, the supernatant liquor was sampled for analysis. The analysis results of the treating liquor are shown in Table 6.

The analytical results show that the total cyano matters of the liquor, which has been treated by the above method, was 0.1 mg/L less than the waste-liquor regulating value of 1 mg/L. Although the ammoniacal nitrogen was not detected, since the ammonia odor was detected, it is clear that a part of the ammonia vaporized into the atmospheric air.

However, the dosing amount of sodium hypochlorite is twice as high as the calculated value, which is economically disadvantageous as compared with the present invention. When the waste liquor is exhausted as treated, there is a danger of influence on the ecological system due to the sterilization effect of chlorine.

TABLE 6

| | Items | Comparative Example 1 | Comparative Example 2 | Comparative Example 3 |
|---|---|---|---|---|
| Before Treatment | PH | 11.4 | 11.4 | 11.4 |
| | Free Cyano Matters (mg/L) | 2200 | 2200 | 2200 |
| | Total Cyano Matters (mg/L) | 3250 | 3250 | 3250 |
| | Cyanic Acid (mg/L) | 3200 | 3200 | 3200 |
| | Ammoniacal Nitrogen (mg/L) | 1380 | 1380 | 1380 |
| | Total Nitrogen(mg/L) | 1860 | 1860 | 1860 |
| Treatment Conditions | Temperature (° C.) | 90 | 90 | 90 |
| | Treating Time (minutes) | 120 | 120 | 120 |
| | Dosage Amount of Sodium Hypochlorite (Relative Amount of Theoretical Amount) | 1.05 | 1.50 | 2.0 |
| After Treatment | PH | 9.7 | 9.5 | 9.5 |
| | Total Cyano Matters (mg/L) | 26.0 | 3.0 | <0.1 |
| | Ammoniacal Nitrogen (mg/L) | ND | ND | ND |
| | Total Nitrogen (mg/L) | 450 | 280 | 250 |

Example 5

In this example, the water-rinse liquor of steel parts treated by the salt-bath nitriding (Tuftriding) (hereinafter referred to as "Tuftriding rinse water") (pH10.4) was treated by the single-step method according to the present invention. This Tuftriding rinse water contained 700 mg/L of free cyano matters, 1160 mg/L of total cyano matters, 990 mg/L of cyanic acid, 470 mg/L of N—NH$_3$, and 520 mg/L of total N. Most of the cyano matters, which correspond to the difference between the total and free cyano matters, are present as the ferrocyanic complex. This waste liquor in an amount of 1 m$^3$ was admitted into the reaction tank 4. While the waste liquor was heated at 1.5° C./minutes of temperature-elevating speed, the 12% sodium hypochlorite aqueous solution was charged at 100 kg/hour of the charging rate until arrival of ORP potential at 640 mV (approximately 1.2 hours). After approximately 45 minutes, the temperature reached 95° C., the temperature was then held. Subsequently, like in Example 1, stirring was carried out for 25 minutes, and the supernatant liquor was sampled as in Example 1. The treated liquor in an amount of 1.1 m$^3$ was obtained. The results are shown in Table 7.

Example 6

The resultant sludge of the salt-bath nitriding (approximately 5% of free CN and approximately 30% of cyanic acid) was dissolved in the Tuftriding rinse water at the concentration of 10% of the sludge. The resultant dissolving liquor was treated by the single-step method of the present invention. This liquor to be treated contained 880 mg/L of total CN (most is free CN), 3320 mg/L of cyanic acid (CNO), 300 mg/L of N—NH$_3$. This waste liquor in an amount of 1 m$^3$ was admitted into the reaction tank 4. While the waste liquor was being heated at 1.5° C./minutes of temperature-elevating speed, 12% sodium hypochlorite aqueous solution was charged at 100 kg/hour of the charging rate until the ORP potential reached 640 mV after approximately 1.5 hours. The water-conveying pump 18 was then stopped. Subsequently, the temperature was held at 85° C. and stirring was carried out for 30 minutes. Subsequently, the procedure like in Example 1 was carried out, to obtain the treated liquor. The treated liquor in amount of 1.12 m³ was obtained. The results are shown in Table 7.

Tuftride waste liquor mentioned above was subjected to the detoxification, as well. The decomposition results of the iron cyano complex at low concentration were satisfactory. The solid-liquid separation was based on the coagulating precipitation method in Examples 7, 8 and 9.

TABLE 7

|  | Example 1 | Example 5 | Example 6 | Example 7 |
|---|---|---|---|---|
| pH of Treated Liquor | 11.4 | 10.1 | 10.4 | 11.1 |
| Concentration of Free CN of Treated Liquor (mg/L) | 2,200 | 3,600 | 700 | — |
| Concentration of Total CN (mg/L) | 3,250 | 4,810 | 1,160 | 880 |
| Concentration of CNO (mg/L) | 3,200 | 6,900 | 990 | 3,320 |
| Concentration of N—NH₃ (mg/L) | 1,380 | 3,100 | 470 | 300 |
| Total N Concentration (mg/L) | 1,860 | 3,650 | 520 | — |
| Treated Amount (m³) | 1 | 1 | 1 | 1 |
| Treating Temperature | RT→95° C. | RT→95° C. | RT→95° C. | RT→95° C. |
| ORP Control | 640 mV | 640 mV | 640 mV | 640 mV |
| Dosage Speed of Reagents (kg/hour) | 300 | 500 | 100 | 100 |
| Addition Amount of NaClO (Relative Ratio to Theoretical Amount) | 1.03 | 1.03 | 1.05 | 1.05 |
| Treating Time (except for separation process of solid and liquid) | 120 minutes | 120 minutes | 120 minutes | 120 minutes |
| Post-treatment pH | 8.4 | 8.4 | 7.8 | 7.7 |
| Post-treatment Total CN Concentration(mg/L) | ND | ND | ND | ND |
| Post-treatment N—NH₃ Concentration (mg/L) | ND | ND | ND | ND |
| Post-treatment N Concentration (mg/L) | 200 | 280 | 40 | — |
| Post-treatment Fe Concentration (mg/L) | 0.2 | 0.5 | <0.1 | — |
| Post-treatment Cr Concentration (mg/L) | 0.02 | 0.05 | — | — |
| Post-treatment Ni Concentration (mg/L) | 0.01 | 0.01 | — | — |

Examples 7, 8, 9

The copper-cyanide plating solution containing Roschelle salt was detoxified by the single-step method of the present invention. The results are shown as Example 7. The prepared waste liquor in Example 8 was a mixed liquor of the copper cyanide plating waste-liquor and the Tuftride waste liquor of Example 1. In every example, the cyano matters were successfully detoxified as shown in Table 8. Particularly, organic matters incorporated into the waste liquor do not exert any influence upon the detoxification treatment.

Example 9 is application to cyano matters of low-concentration. That is, the ten-times diluted solution of the

TABLE 8

|  | Reference Example 2 | Example 6 | Example 7 |
|---|---|---|---|
| pH of Treated Liquor | 12.5 | 11.6 | 10.6 |
| Concentration of Free CN of Treated Liquor (mg/L) | — | — | — |
| Concentration of Total CN (mg/L) | 10,700 | 5,760 | 410 |
| Concentration of CNO (mg/L) | — | — | — |
| Concentration of N—NH₃ (mg/L) | 350 | 650 | 120 |
| Total N Concentration (mg/L) | 550 | 770 | 150 |
| Treated Amount (m³) | 1 | 1 | 1 |
| Treating Temperature | RT→95° C. | RT→95° C. | RT→95° C. |
| ORP Control | 660 mV | 630 mV | 600 mV |
| Dosage Speed of Reagents (kg/hour) | 500 | 300 | 50 |
| Addition Amount of NaClO (Relative Ratio to Theoretical Amount) | 1.02 | 1.05 | 1.04 |
| Treating Time (except for separation process of solid and liquid) | 120 minutes | 120 minutes | 100 minutes |
| Post-treatment pH | 8.0 | 8.2 | 7.8 |
| Post-treatment Total CN Concentration (mg/L) | <0.1 | <0.1 | ND |
| Post-treatment N—NH₃ Concentration (mg/L) | ND | ND | ND |
| Post-treatment N Concentration (mg/L) | 180 | 160 | 15 |

Comparative Examples 4, 5, 6

In Comparative Example 4, the theoretical amount of the sodium hypochlorite aqueous solution was charged in total at the initial period after heating. In Comparative Example 5, the total amount of the sodium hypochlorite aqueous solution was added in total before heating, and the treating temperature was 90° C. In Comparative Example 6, the treating temperature was 90° C., and the sodium hypochlorite aqueous solution was charged until non-detection of CN. The reaction time was 120 minutes after the temperature rise to 90° C., in every example. However, since the reaction tank was of open structure, the ammonia odor was detected during the temperature rise. That is, the ammonia was not treated by reactions, but was stripped from the reaction tank. The working environment was detrimentally influenced, and the ammonia gas vaporized into the atmospheric air.

In each of Comparative Examples 4 and 5, the total CN value did not meet the waste-water regulation value, i.e., 1 mg/L. It was recognized by ORP that the hypochlorite remains after the treatment. In Comparative Example 6, successful treatment was not attained unless sodium hypochlorite is changed in an amount as high as twice the theoretical amount.

TABLE 9

|  | Comparative Example 4 | Comparative Example 5 | Comparative Example 6 |
|---|---|---|---|
| pH of Treated Liquor | 11.4 | 11.4 | 11.4 |
| Concentration of Free CN of Treated Liquor (mg/L) | 2,200 | 2,200 | 2,200 |
| Concentration Total CN (mg/L) | 3,250 | 3,250 | 3,250 |
| Concentration of CNO (mg/L) | 3,200 | 3,200 | 3,200 |
| Concentration of N—$NH_3$ (mg/L) | 1,380 | 1,380 | 1,380 |
| Total N Concentration (mg/L) | 1,860 | 1,860 | 1,860 |
| Treated Amount ($m^3$) | 1 | 1 | 1 |
| Treating Temperature | 95° C. | 95° C. | 95° C. |
| Addition Amount of NaClO (Relative Ratio to Theoretical Amount) | 1.05 | 1.05 | 1.9 |
| Treating Time (except for separation process of solid and liquid) | 120 minutes | 120 minutes | 120 minutes |
| Post-treatment Total CN Concentration (mg/L) | 81.5 | 26.0 | <0.1 |
| Post-treatment N—$NH_3$ Concentration (mg/L) | ND | ND | ND |
| Post-treatment Total N Concentration (mg/L) | 620 | 450 | 250 |

Example 10

Figure 6:
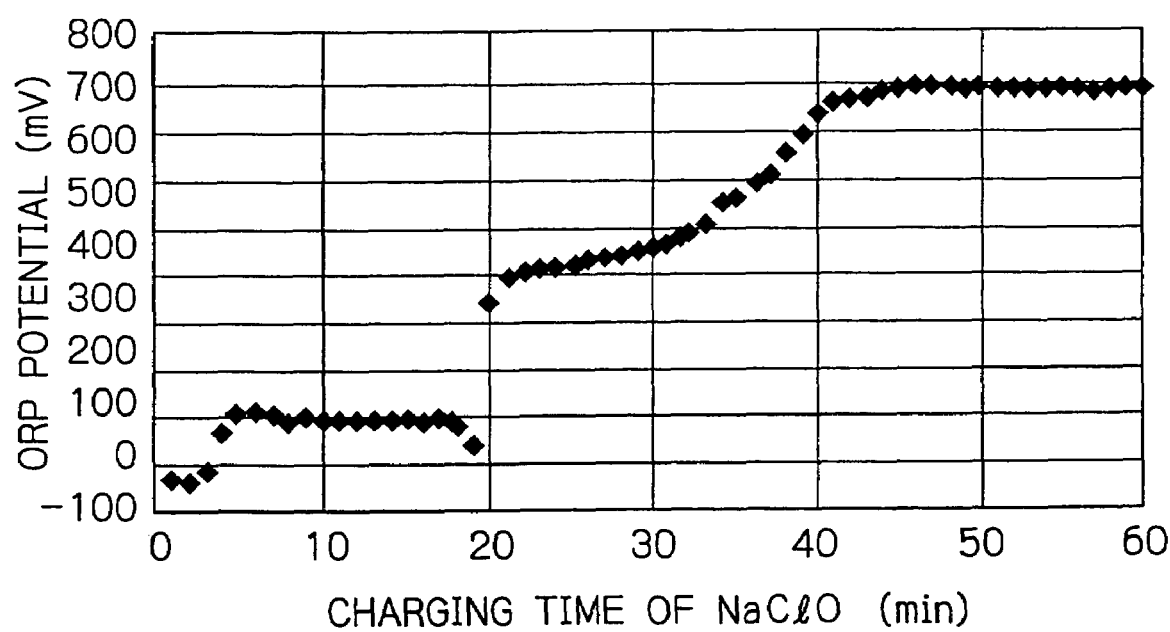
FIG. 6 is a graph showing the oxidation-reduction potential in an example, in which the copper-plating waste-liquor is detoxified.

The cyano-based copper-plating liquor in 200 mL was admitted in the reaction tank, as it was. It was heated to approximately 95° C., followed by addition of the 10% sodium hypochlorite solution at a speed of 40 kg/h. The ORP potential was measured. The ORP potential varied in 500~800 mV as shown in FIG. 6. After preliminarily measuring this ORP change curve, the potential was set at 600 mV. The sodium hypochlorite was continuously added to the identical plating solution under the identical conditions until reaching the setting potential. Stirring was then carried out for 30 minutes. After standing still for 3 hours, the supernatant liquor was analyzed. As shown in Table 2, CN was completely analyzed and black precipitates were formed. $Cu_2O$ was identified by XRD analysis of the precipitates. The recovery ratio of Cu is 99.8% or more, and the $Cu_2O$ ratio in the precipitates was 93.5%.

Example 11

The rinsing waste-water, which was discharged from the salt-bath nitriding line, was subjected to the treatment process of the present invention by means of an experimental apparatus, which virtually follows the process-flow chart shown in FIG. 5.

The analytical results of the rinsing waste-water, which was discharged from the salt-bath nitriding line, are shown in Table 10.

This waste-water in 100 L was admitted into a reaction vessel 4 provided with a stirrer 8 and was heated by a heater 7. Temperature was elevated from the room temperature to the setting temperature of 95° C. in 40 minutes. The ORP potential at the room temperature (25° C.) was 28 mV. Along with the temperature rise, the potential was lowered to −88 mV at the setting temperature of 95° C. When the temperature reached the setting temperature, the dosing of the sodium hypochlorite (the effective chlorine being 12%) was started in such a manner that it was dosed from the reservoir tank 2 by means of the continuous flow pump 22. After dosing start, the inflection points were detected as follows: the first inflection point ~0~100 mV after 5~6 minutes; the second inflection point −300~420 mV after 10~12 minutes; and the third inflection point −530~590 mV after 40~45 minutes. After passing these inflection points, the potential was elevated to 600 mV, so that the dosing of sodium hypochlorite was stopped. At this instance, the sampling for analysis was taken. The liquor temperature was maintained at 95° C. and the stirring was continued. An additional sampling was made after 10 minutes and 30 minutes so as to investigate the effects of aging. The heating and stirring were then stopped.

Red-brown sludge, which appeared to be ferric oxide, was accumulated on the bottom of a tank; this was withdrawn, and the residual liquor was transferred to the neutralizing precipitation tank. The liquor in the neutralizing precipitation tank was transferred to a heat exchanger to lower the temperature to 60° C. or less. The sodium bisulfite aqueous solution (10% solution) was dosed from a reservoir tank (not shown) into the liquor mentioned above until the ORP potential was lowered to 250 mV or less. The residual chlorine was decomposed. Subsequently, the dilute sulfuric acid was dosed from the reservoir tank 3 to adjust pH to a value of 7~8. Subsequently, polymer flocculant was dosed from a reservoir tank (not shown) and the stirring was stopped, thereby promoting the formation of flocs. The sludge on the bottom was withdrawn and the residual liquor was transferred to a separate reservoir tank of treated water. The treated water was subjected to the analysis of total cyano matters. After confirming that the total cyano matters was within the regulated value, the treated water passed through a not-shown filtration tower and guided through an effluent tower (not shown). Thus, the treatment was completed.

The results of experiments are shown in Table 10.

At the instance that the ORP-potential rise terminates, the dosing of sodium hypochlorite was stopped. Subsequently, aging was performed in such a manner that the temperature was maintained and stirring was continued for a predetermined time. Investigation of the aging effects revealed its great contribution.

In the case of without aging, the total cyano matters amounted to 6.8 ppm and hence exceeded the regulated value of 1 ppm. The total cyano matters decreased to 0.9 ppm and less than the detecting limit (0.1 ppm) by the aging for 10 minutes and 30 minutes, respectively.

The result shows that the dosing amount of sodium hypochlorite is less than the theoretical value, probably because ammonia was stripped during the temperature-elevation from the room temperature to 95° C.

Slurry was discharged from the bottom of a reaction tank and dried in a drying furnace. The resultant sludge in 0.2 g was weighed and analyzed by a method, which basically follows a method of JIS K0102/38 for analyzing the total cyano matters. However, the phosphoric acid added during the distillation was 50 mL in order to completely dissolve the sludge, i.e., 40 mL in excess as compared with the ordinary method. The result was that the total cyano matters are less than the detection limit.

Judging from this result, the sludge, which generates along with the inventive treatment, can be disposed as the ordinary industrial discard.

TABLE 10

| | Items | Example 11-1 | Example 11-2 | Example 11-3 |
|---|---|---|---|---|
| Before Treatment | pH | 11.4 | 11.4 | 11.4 |
| | Free Cyano Matters (mg/L) | 2200 | 2200 | 2200 |
| | Total Cyano Matters (mg/L) | 3250 | 3250 | 3250 |
| | Cyanic Acid (mg/L) | 3200 | 3200 | 3200 |
| | Ammoniacal Nitrogen (mg/L) | 1380 | 1380 | 1380 |
| Treatment Conditions | Setting Temperature (° C.) | 95 | 95 | 95 |
| | Reached Potentail (mV) | 600 | 600 | 600 |
| | Dosage Amount of Sodium Hypochlorite (Relative Amount of Theoretical Amount) | 0.78 | 0.78 | 0.78 |
| | Aging Time (minutes) | 0 | 10 | 30 |
| After Treatment | pH | 10.2 | 10.2 | 10.2 |
| | Total Cyano Matters (mg/L) | 6.8 | 0.9 | ND |
| | Ammoniacal Nitrogen (mg/L) | <1 | <1 | <1 |

INDUSTRIAL APPLICABILITY

In the heat-treatment industry and plating industry, it has been required to develop a detoxification treatment of the cyano waste-liquor containing a stable cyano complex, which method does not incur excessively large investment cost and is reliable. In the present invention, the objective was attained in as much the investment cost is not high and the method is reliable in the detoxification.

The invention claimed is:

1. A method of treating cyano waste-liquor, comprising: oxidation-decomposing the waste liquor containing a cyano complex by adding hypochlorite under alkaline conditions, wherein said waste liquor, which contains at least one cyano complex of iron, cobalt or gold, is heated up to and then maintained at a temperature range of from 80° C. to boiling point, and hypochlorite is continuously or intermittently added until the waste liquor arrives at an oxidation-reduction potential of the hypochlorite, and upon completion of the oxidation-decomposing, the hypochlorite is present in small excess, so that the oxidation-reduction potential of the hypochlorite is detected.

2. The method of treating cyano waste-liquor, according to claim 1, wherein the waste liquor contains at least one of ammonia or free cyano matter, the waste liquor is heated up to a temperature range lower than 80° C., hypochlorite is continuously or intermittently added into said waste liquor until the waste liquor arrives at 400 mV of the oxidation-reduction potential, and the temperature is subsequently elevated up to the range of from 80° C. to boiling point while said hypochlorite is added until the oxidation-reduction potential of the waste liquor arrives at the oxidation-reduction potential of hypochlorite.

3. The method of treating cyano-waste-liquor according to claim 1, wherein the oxidation-reduction potential of the waste liquor is measured at room temperature.

4. The method of treating cyano-waste liquor according to any one of claims 1 through 3, further comprising aging by holding the temperature of said waste liquor within said temperature range of from 80° C. to boiling point, the aging being performed subsequent to the waste liquor arriving at the oxidation-reduction potential of hypochlorite.

5. The method of treating the cyano waste-liquor according to claim 1, wherein said waste liquor is rinsing waste-liquor of steel parts treated by salt-bath nitriding.

6. The method of treating the cyano waste-liquor according to claim 1, wherein said waste liquor is cyano plating waste-liquor.

7. The method of treating the cyano waste-liquor according to claim 1, wherein a dosage amount of the hypochlorite is up to 1.05 relative to a theoretical amount.

8. The method of treating the cyano waste-liquor according to claim 1, wherein a dosage amount of the hypochlorite is up to 1.02 to 1.05 relative to a theoretical amount.

* * * * *